United States Patent
Bruce et al.

(10) Patent No.: US 10,230,941 B2
(45) Date of Patent: *Mar. 12, 2019

(54) SYSTEMS AND DEVICES FOR ACQUIRING IMAGERY AND THREE-DIMENSIONAL (3D) MODELS OF OBJECTS

(71) Applicant: GOOGLE LLC, Mountain View, CA (US)

(72) Inventors: James Robert Bruce, Sunnyvale, CA (US); Arshan Poursohi, Berkeley, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/658,126

(22) Filed: Jul. 24, 2017

(65) Prior Publication Data

US 2017/0324947 A1    Nov. 9, 2017

Related U.S. Application Data

(63) Continuation of application No. 14/580,182, filed on Dec. 22, 2014, now Pat. No. 9,807,373.
(Continued)

(51) Int. Cl.
*H04N 13/02*      (2006.01)
*H04N 13/275*     (2018.01)
(Continued)

(52) U.S. Cl.
CPC .......... *H04N 13/275* (2018.05); *G01B 11/24* (2013.01); *G06T 15/00* (2013.01); *H04N 13/282* (2018.05); *H04N 13/296* (2018.05)

(58) Field of Classification Search
CPC .. H04N 13/275; H04N 13/296; H04N 13/282; G01B 11/24; G06T 15/00
(Continued)

(56) References Cited

U.S. PATENT DOCUMENTS 6,343,184 B1    1/2002   Huebner
7,012,637 B1    3/2006   Blume et al.
(Continued)

OTHER PUBLICATIONS

Gühring, Jens, "Dense 3D surface acquisition by structured light using off-the-shelf components." Photonics West 2001—Electronic Imaging. International Society for Optics and Photonics, 2000.
(Continued)

*Primary Examiner* — Jared Walker
(74) *Attorney, Agent, or Firm* — McDonnell Boehnen Hulbert & Berghoff LLP (57) ABSTRACT

Systems and devices for acquiring imagery and three-dimensional (3D) models of objects are provided. An example device includes a platform configured to enable an object to be positioned thereon, and a plurality of scanners configured to capture geometry and texture information of the object when the object is positioned on the platform. A first scanner is positioned below the platform so as to capture an image of a portion of an underside of the object, a second scanner is positioned above the platform, and a third scanner is positioned above the platform and offset from a position of the second scanner. The scanners are positioned such that each scanner is outside of a field of view of other scanners. Scanners may include a camera, a light source, and a light-dampening element, and the device may include a control module configured to operate the scanners to individually scan the object.

20 Claims, 8 Drawing Sheets

Related U.S. Application Data (60) Provisional application No. 61/921,110, filed on Dec. 27, 2013.

(51) Int. Cl.
    H04N 13/282    (2018.01)
    H04N 13/296    (2018.01)
    G01B 11/24     (2006.01)
    G06T 15/00     (2011.01)

(58) Field of Classification Search
    USPC .......................................................... 348/48
    See application file for complete search history.

(56) References Cited

U.S. PATENT DOCUMENTS

| | | |
|---|---|---|
| 2007/0195162 A1 | 8/2007 | Graff et al. |
| 2011/0228115 A1 | 9/2011 | Ben-Ezra |
| 2012/0177350 A1 | 7/2012 | Jancourtz |
| 2012/0313955 A1* | 12/2012 | Choukroun ............. G06T 19/00 345/582 |

OTHER PUBLICATIONS

Scharstein, et al., "High-accuracy stereo depth maps using structured light." Computer Vision and Pattern Recognition (CVPR), 2003, pp. 195-202.

Salvi, et al., "Pattern codification strategies in structured light systems." Pattern Recognition 37.4 (2004).

Grossberg, et al., "What is the space of camera response functions?." Computer Vision and Pattern Recognition (CVPR), 2003. http://www.cs.columbia.edu/CAVE/software/softlib/dorf.php.

Garland, et al., "Surface simplification using quadric error metrics." Proceedings of the 24th annual conference on Computer graphics and interactive techniques, 1997.

HDI Advance, http://www.3d3solutions.com/products/3d-scanner/hdi-advance/, retrieved on Jan. 12, 2015.

* cited by examiner

SYSTEMS AND DEVICES FOR ACQUIRING IMAGERY AND THREE-DIMENSIONAL (3D) MODELS OF OBJECTS

CROSS-REFERENCE TO RELATED APPLICATION

The present application is a continuation of U.S. application Ser. No. 14/580,182, filed on Dec. 22, 2014, which claims priority to U.S. patent application Ser. No. 61/921,110, filed on Dec. 27, 2013, the entire contents of each of which are incorporated herein by reference.

BACKGROUND

In computer graphics, three-dimensional (3D) modeling involves generation of a representation of 3D features of an object. The representation may be referred to as a 3D object data model, and can be rendered or displayed as a two-dimensional image via 3D rendering or displayed as a 3D image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or objects can be scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

Within one aspect, a device is provided that comprises a platform configured to enable an object to be positioned thereon, and a plurality of scanners configured to capture geometry and texture information of the object when the object is positioned on the platform. A first scanner of the plurality of scanners is positioned below the platform so as to capture an image of a portion of an underside of the object when the object is positioned on the platform, a second scanner of the plurality of scanners is positioned above the platform, and a third scanner of the plurality of scanners is positioned above the platform and offset from a position of the second scanner. The plurality of scanners are positioned such that each scanner is outside of a field of view of other scanners.

In some examples, scanners include a camera, a light source, and a light-dampening element coupled to the light source, and the device further comprises a control module configured to operate the plurality of scanners to individually scan the object when the object is positioned on the platform to capture the geometry and texture information. The control module is configured to cause the light-dampening element to cover the light source of respective scanners during scanning by another scanner and to cause the light-dampening element to uncover the light source of a given scanner during scanning by the given scanner.

In further examples, the device comprises a support structure, a plurality of rollers coupled to the support structure, the platform mounted such that edges of the platform contact the plurality of rollers and a surface of the platform is configured to enable the object to be positioned thereon, and a drive wheel coupled to the support structure and the platform. The drive wheel is configured contact the edges of the platform and to cause the platform to rotate via contact with the drive wheel and the plurality of rollers.

In still further examples, the device comprises an enclosure, and the plurality of scanners are positioned within the enclosure, and a plurality of air ducts within the enclosure and coupled to the plurality of scanners. A given air duct is coupled to a given scanner of the plurality of scanners. The device also includes an exhaust fan positioned outside of the enclosure and coupled to the plurality of air ducts, and the exhaust fan is configured to cause heat generated by the plurality of scanners to be removed from the enclosure.

In another aspect, a device is provided that comprises a support structure, a plurality of rollers coupled to the support structure, a turntable mounted such that edges of the turntable contact the plurality of rollers and a surface of the turntable is configured to enable an object to be positioned thereon, a drive wheel coupled to the support structure and the turntable that is configured contact the edges of the turntable and to cause the turntable to rotate via contact with the drive wheel and the plurality of rollers, and a plurality of scanners configured to capture geometry and texture information of the object when the object is positioned on the surface of the turntable. A first scanner of the plurality of scanners is positioned below the turntable so as to capture an image of a portion of an underside of the object when the object is positioned on the surface of the turntable and a second scanner of the plurality of scanners is positioned above the turntable.

In still another aspect, a device is provided that comprises an enclosure, a plurality of scanners positioned within the enclosure and configured to be operated to capture geometry and texture information of an object when the object is positioned within the enclosure, and a plurality of air ducts within the enclosure and coupled to the plurality of scanners. A given air duct is coupled to a given scanner of the plurality of scanners. The device also includes an exhaust fan positioned outside of the enclosure and coupled to the plurality of air ducts, and the exhaust fan is configured to cause heat generated by the plurality of scanners to be removed from the enclosure.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a system is provided that is configured to capture images of an object and generate a 3D object data model of the object. The system may include a turntable upon which an object is placed for scanning, a number of scanheads including cameras and projectors, and an enclosure for the system. To scan an object, at each incremental position of the turntable and for each scan head, a camera is configured to capture texture images, the projector is configured to project patterns onto the object while the camera captures images, and a decoding of the images of patterns projected onto the object is performed to output a raw mesh of data representing the object. The raw mesh of data may be substantially aligned, and a merged model of the object can be generated in post-processing.

Within examples, the projectors are configured to project many different patterns onto the object, including graycodes to identify pixel-level locations, alternate phase graycodes for robustness, stripes to obtain sub-pixel correspondences, "XY" horizontal and vertical patterns (for graycodes and stripes), and multiple pattern intensities for high-dynamic range image processing to name a few. One example system may be configured to utilize 191 patterns and perform a scan within about 25 seconds.

Figure 1:
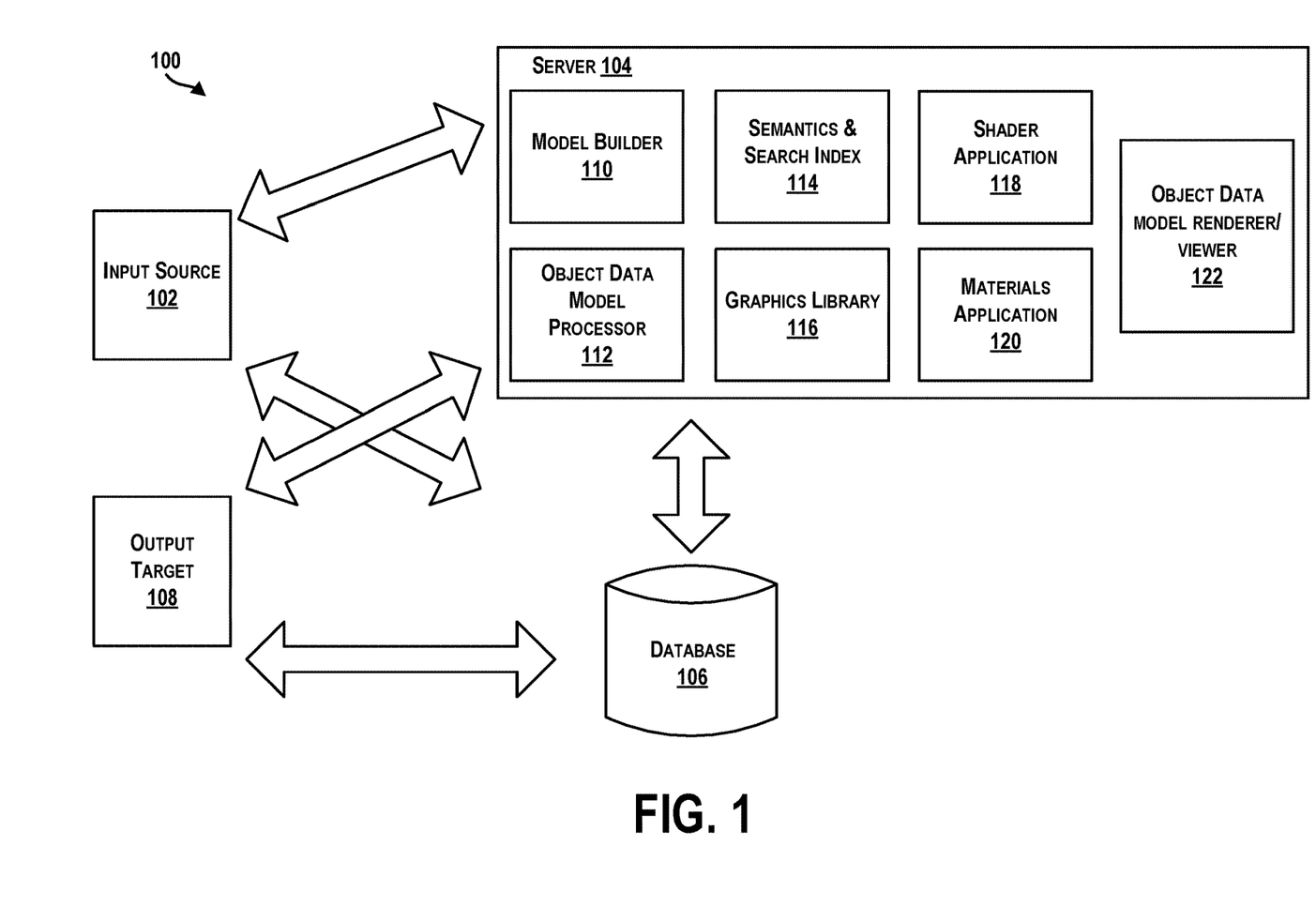
FIG. 1 illustrates an example system for object data modeling, in accordance with one example.

Referring now to the figures, FIG. 1 illustrates an example system 100 for object data modeling, in accordance with one example. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as short-range wireless, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution SLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, and a graphics library 116, a shader application 118, a materials application 120, and an object data model renderer/viewer 122. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example, and may take the form of a computing device.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets H that have colors but no UV (coordinate system of a 2D texture space) unwrapping to generate a mesh D with UV unwrapping but no colors. As an example, for a single output texture pixel of an image processing may include, for a given point in UV determine a triangle in the mesh's UV mapping D, and using triangle-local coordinates, move to an associated 3D point on the mesh. A bidirectional ray may be cast along the triangle's normal to intersect with the mesh H, and color, normal and displacement may be used for an output. To generate an entire texture image, each pixel in the image can be processed.

In some examples, the model builder 110 or the object data model processor 112 may output a 3D object data model of an object that includes one file with a combination of all data needed to render a 3D image of the object. In other examples, the model builder 110 or the object data model processor 112 may output a 3D object data model in the form of multiple files so that the 3D object data model file is divided into smaller parts.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or the files comprising the 3D object data model from the model builder 110 or the object data model processor 112, and may be configured to label portions of the file or each file individually with identifiers related to attributes of the file.

In some examples, the semantics and search index 114 may be configured to provide annotations for aspects of the 3D object data models. For instance, an annotation may be provided to label or index aspects of color, texture, shape, appearance, description, function, etc., of an aspect of a 3D object data model. Annotations may be used to label any aspect of an image or 3D object data model, or to provide any type of information. Annotations may be performed manually or automatically. In examples herein, an annotated template of an object in a given classification or category may be generated that includes annotations, and the template may be applied to all objects in the given classification or category to apply the annotations to all objects.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The shader application 118 may be configured to apply a shader to portions of the 3D object data model file or to files of the 3D object data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

The materials application 120 may be configured to apply a material to portions of the 3D object data model file or to files of the 3D object data model according to the indexes of the file (as labeled by the semantics and search index 114) to generate a 3D image. The materials application 120 may be executed to apply a material from a number of materials according to the indexes of the file. The materials application may apply any material, such as leather, metal, wood, etc., so as to render an appearance of a portion of the 3D image.

In one example, the materials application 120 may access a database that includes information regarding a number of reference materials (e.g., brass, fur, leather), and objects with multiple materials may be separated into distinct portions so that the materials application 120 can be executed to render the separate distinct portions. As an example, a hood on a car may include a hood ornament, and the hood may be painted and the ornament may be chrome. The materials application 120 and the shader application 118 can be executed to identify two separate materials and render each material with an appropriate shade.

The object data model renderer/viewer 122 may receive the 3D object data model file or files and execute the shader application 118 and the materials application 120 to render a 3D image.

The database 106 may store all data sets for a 3D object data model in any number of various forms from raw data captured to processed data for display.

The output target 108 may include a number of different targets, such as a webpage on the Internet, a search engine, a database, a computing device, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

Figure 2:
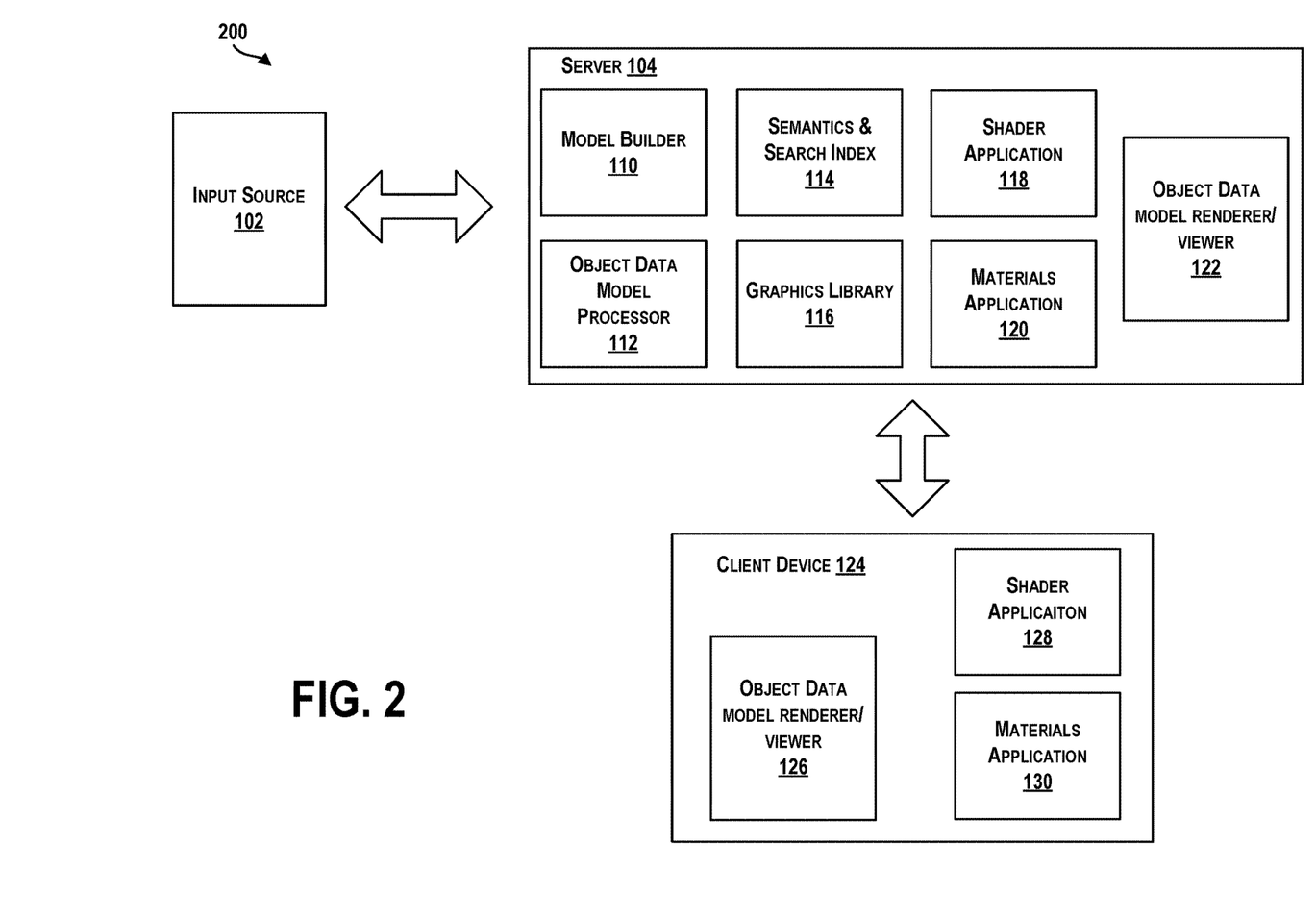
FIG. 2 illustrates another example system for object data modeling, in accordance with one example.

FIG. 2 illustrates another example system 200 for object data modeling, in accordance with one example. The system 200 includes the input source 102 coupled to the server 104, which is coupled to a client device 124. The input source 102 and the server 104 may be as described in FIG. 1. The client device 124 may receive outputs from any of the components of the server 124, and may be configured to render a 3D image.

The client device 124 includes an object data model renderer/viewer 126, a shader application 128, and a materials application 130. The object data model renderer/viewer 126, the shader application 128, and the materials application 130 may all be configured as described with respect to the object data model renderer/viewer 122, the materials application 120, and the shader application 118 of the server 104 as described with respect to FIG. 1.

In some examples, the client device 124 may receive the 3D object data model file or files from the server 104 and render a 3D image of the object by executing the shader application 128 and the materials application 130. When executing the shader application 128 and the materials application 130, the client device 124 may access separate databases to retrieve appropriate shader and material information to apply to the image, access the server 104 to receive appropriate shader and material information from the shader application 118 and the materials application 120, or may store information locally regarding the appropriate shader and material information to apply.

In some examples, the client device 124 may receive the 3D object data model file or files from the server 104 and render a 3D image of the object. In other examples, the server 104 may render a 3D image of the object and stream the 3D image to the client device 124 for display.

As described, in some examples, the 3D object data model may include various forms of data, such as raw image data captured, mesh data, processed data, etc. Data of the 3D object data model may be encoded and compressed so as to store information related to 3D geometry of an object associated with information related to appearance of the object for transmission and display within a web browser or application on a device.

In one example, data of the 3D object data model may be compressed by initially encoding a triangle mesh representing the 3D object as a list including a plurality of vertices and a plurality of indices. Each vertex in the list may have several arbitrary parameters associated with the vertex, including, but not limited to, position, surface normal, and texture coordinates. The triangle indices may be stored in a 16-bit unsigned integer format and vertex attributes may be stored in a 32-bit floating point format. The 32-bit floating point format vertex attributes may be reduced to 15-bits. In instances in which compressed data is for a version of a web browser or application that does not have the ability to decompress dictionary encoded data, a delta compression may be used to store differences between the triangle indices and vertex attributes, either in an array of structures layout or a transposed layout. After delta compression, post-delta data may be ZigZag encoded (e.g., using open-source Protocol Buffer library available from Google Inc.). Encoding may follow the format ZigZag(x): $(x<<1)^{\wedge}(x>>15)$ with a corresponding decoding (during decompression) to follow the format UnZigZag(x): $(x>>1)^{\wedge}(-(x\ \&\ 1))$. ZigZag encoding may be followed by multi-byte character encoding using UTF-8 encoding. Finally, the UTF-8 encoded data may be compressed using GNU Gzip or bzip2 to generate a compressed 3D object data model file.

The compressed copy of the 3D object data model file may be stored in a database, such as the database 106 in FIG. 1, in the server 104, or on the client device 124, for example. In some examples, the compressed 3D object data model file may be provided by the server 104 to the client device 124 in response to a request from the client device 124. If using a web browser to view the 3D object data model file, the client device 124 may decompress the compressed 3D object data model file according to Java instructions provided in the object browser web page. A local copy of the object browser web page and a local copy of the uncompressed, searchable data of the 3D object data model file can be stored in local memory of the client device 124. The client device 124 may display exemplary screenshots of an initial default view of a 3D object, based on the searchable data of the 3D object data model file loaded in the web browser.

In some examples, the 3D object data file includes information as to geometry of an object sorted by material and divided into portions to be loaded as fragments and reassembled in portions by the client device. As one example, for a mobile phone comprising multiple parts, each part may be rendered using a separate or distinct shader for each material. Thus, the 3D object data file may be divided into multiple portions and compressed as described above to retain all portions. The client device may receive the compressed 3D object data file, decompress the file, and reassemble the portions of the object one-by-one by loading each fragment of the file, streaming file requests for each shader, and reassembling an image of the object.

Components of the system 200 in FIG. 2 (or the system 200 itself), and components of the system 100 in FIG. 1 (or the system 100 itself) may be configured to perform functions, processes and methods disclosed herein. In this regard, any described functions, processes, or methods may be represented by a module, a segment, or a portion of program code, which includes one or more instructions executable by a processor (e.g., the object data model processor 112) for implementing specific logical functions or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. The computer readable medium may be tangible and may differ from a wireless or transitory communication medium.

As described above, the systems 100 or 200 may be used to acquire data (e.g., images) of an object, process the data to generate a 3D object data model, and render the 3D object data model for display. The systems 100 and 200 are illustrated as block diagrams in FIGS. 1 and 2.

Figure 3:
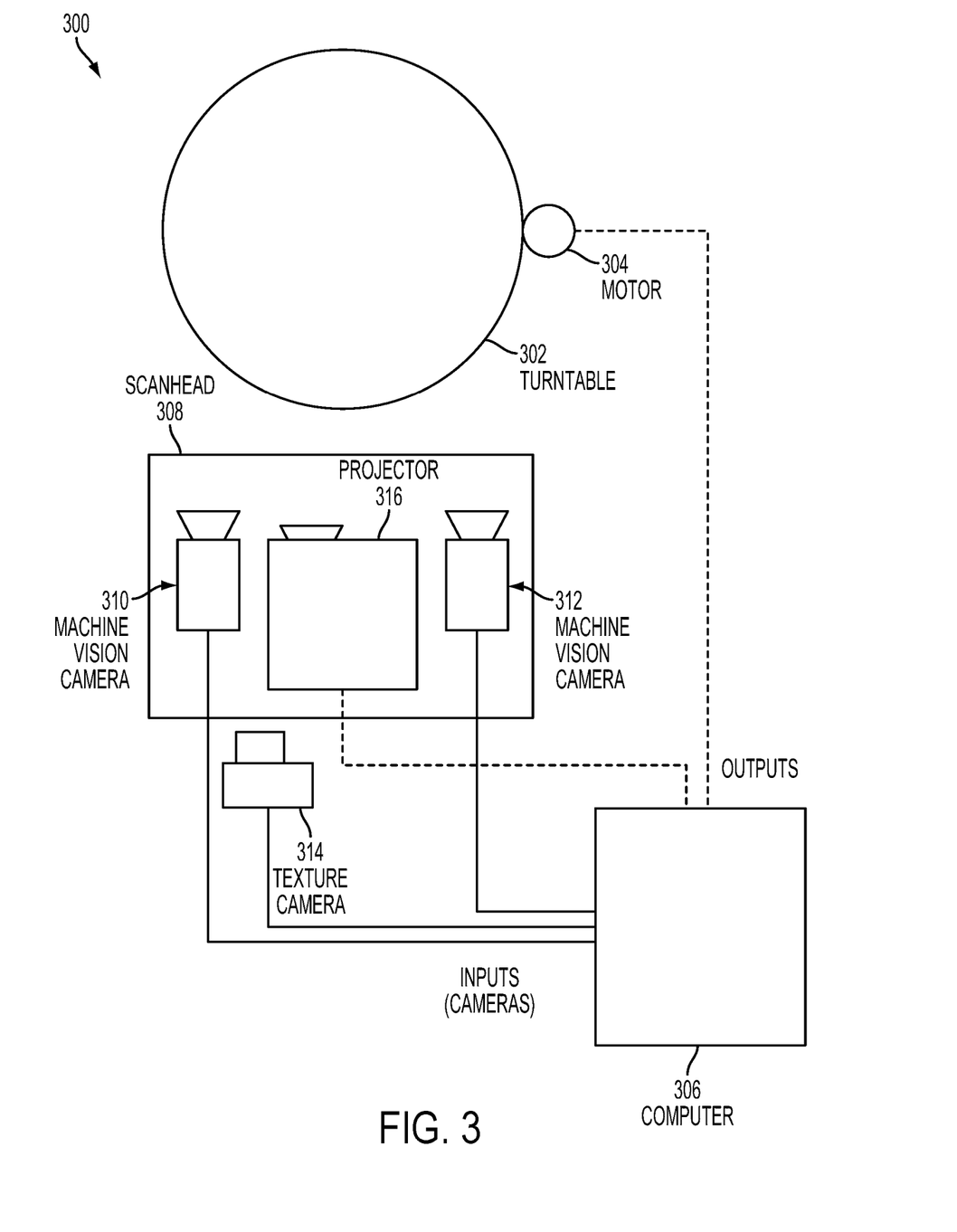
FIG. 3 illustrates a block diagram of an example system for image acquisition, in accordance with an embodiment.

FIG. 3 illustrates a block diagram of an example system 300 for image acquisition, in accordance with an embodiment. The system 300 includes a turntable 300 coupled to a motor 304 that is configured to rotate the turntable 302 based on instructions received from a computer 306. A scanhead 308 is positioned proximate to the turntable 302 to capture images of an object on the turntable 302. The scanhead 308 includes two machine vision cameras 310 and 312 configured to capture RGB or high-resolution images of the object, a texture camera 312 configured to capture depth information of the object, and a projector 316 configured to project patterns onto the object. The scanhead 308 may be coupled to the computer 306 and may be configured to capture images when triggered to do so by the computer 306.

Figure 4A:
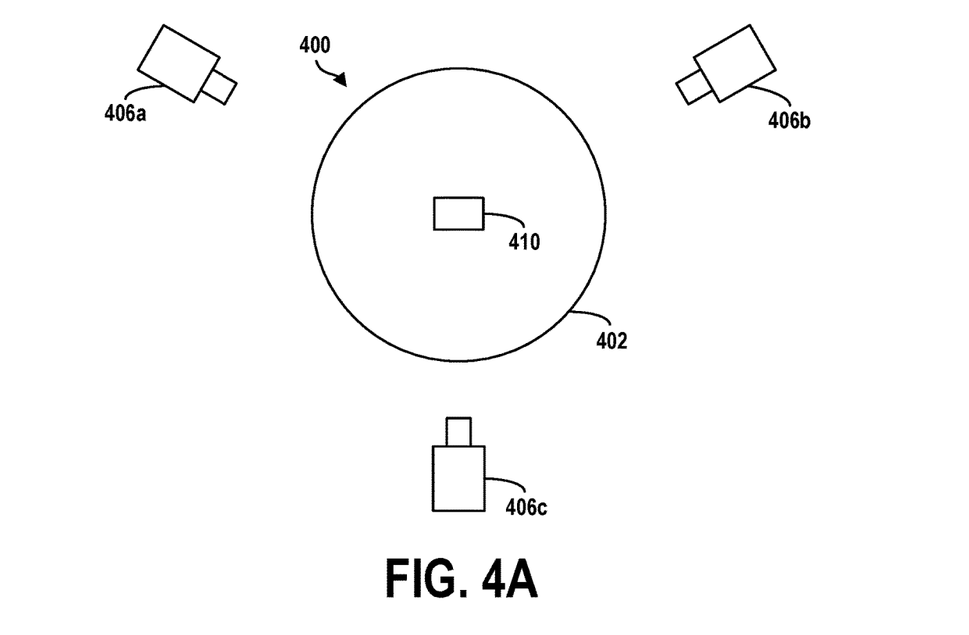
FIG. 4A illustrates a top view of another example system for image acquisition, in accordance with an embodiment.
Figure 4B:
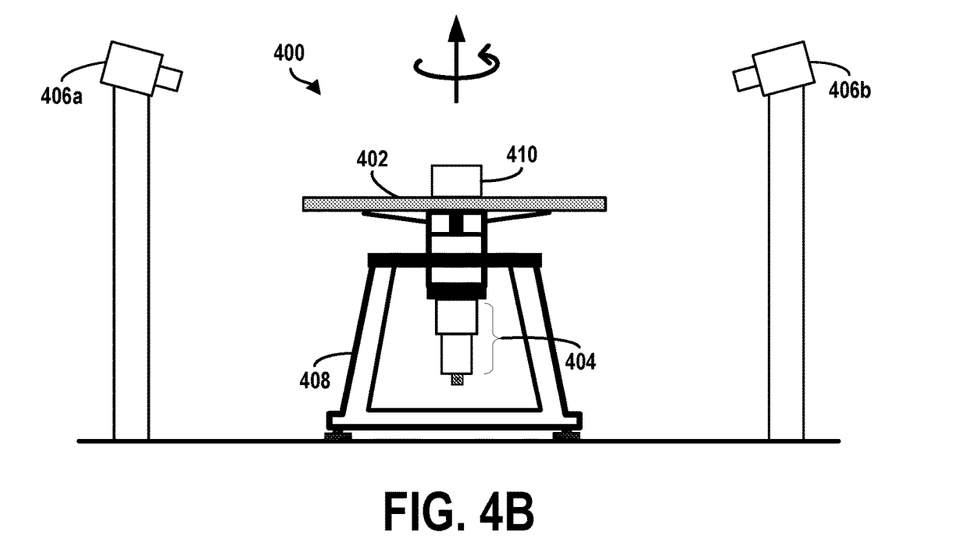
FIG. 4B illustrates a front view of the example system for image acquisition, in accordance with an embodiment.

FIG. 4A illustrates a top view of another example system 400 for image acquisition, in accordance with an embodiment and FIG. 4B illustrates a front view of the example system for image acquisition, in accordance with an embodiment. The system 400 may be an example of the input source 102 in FIGS. 1-2, for example.

The system 400 in FIGS. 4A-4B may include a rotatable surface 402 that a computing device may be configured to cause to incrementally rotate to multiple angles using a drive system 404. The rotatable surface 402 is shown as a circular surface for illustration only. Other shapes are possible. The drive system 404 may, for example, include one or more motors and motor drive systems configured to receive commands from the computing device and control rotation of the one or more motors. In some examples, the rotating surface 402 may be configured to be rotated manually. Other drive systems are possible.

The system 400 may include scanners 406A-C positioned around the rotatable surface 402. Three projectors 406A-C are shown for illustration only. More or less scanners may be used. In the example system 400, the scanners 406A-C are positioned around the rotatable surface 402 such that the computing device is configured to cause the rotatable surface 402 to rotate using the drive system 404. The scanners 406A-C may include projectors and cameras.

The system 400 may include a support 408, as shown in FIG. 4B, that is configured to support the rotatable surface 402, and the drive system 404. Configuration of the support 408 shown in FIG. 4B is for illustration only. Other support configurations are possible.

The system 400 may be configured to acquire images of an object 410 that is placed on the rotatable surface 402. The object 410 can be any object (e.g., a bag, a shoe, a phone, etc.). The computing device may be configured to cause the rotatable surface 402 to rotate to eight discrete angles (e.g., 45°, 90°, 135°, 180°, 225°, 270°, 315°, and 360°) from a given starting point. In one example, the rotatable surface 402 may comprise a transparent material and the scanners 406A-C may be configured to capture images of the object from a given elevation (e.g., below the rotatable surface 402) that allows capturing images of a bottom view of the object 410 through the transparent rotatable surface 402.

In an example, each of the scanners 406A-C may include a respective light source. In this example, the computing device may be configured to control the light source to project a pattern on the object 410, where the pattern is made of light emitted from the light source. The pattern may be simple (e.g., dots tracing a curve), or complex (e.g., a flower).

The light source may generally include any type of an electromagnetic radiation source. Light source and electromagnetic radiation source are used interchangeably herein. The electromagnetic radiation source may be configured to project light of any wavelength, visible or invisible. For example, the electromagnetic radiation source may be configured to project visible light such as laser beams with different colors and may additionally or alternately be configured to project invisible light such as infrared light. The computing device may be configured to switch on or activate the scanners 406A-C to project the pattern on the object 412, and may be configured to switch off or deactivate the projectors 406A-C to remove the pattern. Multiple patterns can be projected on the object 410. In examples, patterns may be projected on substantially all parts (e.g., sides, edges, etc.) of the object 410 and may include multiple colors.

One or more of the scanners 406A-C may be configured to capture, and capable of capturing, while the pattern is projected on the object 410, images that depict the pattern projected by the projectors of the scanners 406A-C on the object 410. For example, if the projectors include electromagnetic radiation sources that project invisible infrared light patterns on the object, the cameras may be configured images while the infrared light pattern is projected on the object 410.

In one example, the scanners 406A-C include multiple cameras mounted adjacent each other. The multiple cameras may include a high-resolution SLR camera configured to capture color images of the object 410, and a depth camera configured to capture depth information of the object 410. The multiple cameras may be mounted in the same enclosure or adjacent each other to capture images and information about the object 410 from the same or substantially same viewpoint.

The rotatable surface 402 may be rotated a number of times to rotate through a number of angles. As an example for illustration, the computing device may be configured to cause the rotatable surface 402 to incrementally rotate to eight discrete angles and repeat capturing respective images of the object 410 using the scanners 406A-C. A number of angles of the multiple angles of rotation may vary based on complexity of the object 410, for example. Images from fewer angles may be captured for a symmetric object, for example, than for a more complex object that is not symmetric. In addition, various lighting or backgrounds may be applied to the object 410, and images may be captured depicting the variations.

In some examples, upon capturing images of the object 410 from the multiple angles of rotation, a given computing device may be configured to match portions of the pattern in each image of the images to corresponding portions of the pattern in subsequent images that are spatially neighboring, based on respective capture angles/locations, so as to spatially align the images. The system 400 may be configured to acquire the images and process the data to generate a 3D object data model of the object 410.

Figure 5:
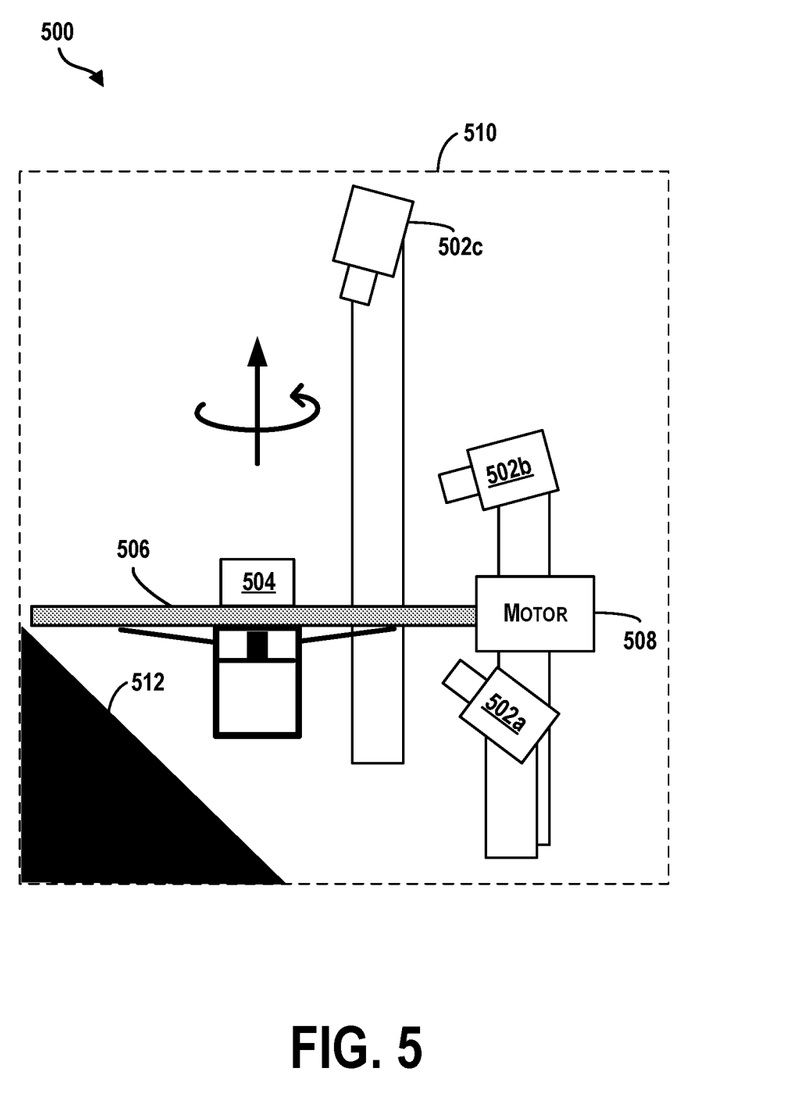
FIG. 5 illustrates a front view of another example system and layout for image acquisition, in accordance with an embodiment.

FIG. 5 illustrates a front view of another example system 500 and layout for image acquisition, in accordance with an embodiment. In FIG. 5, the system 500 includes three scanheads 502A-C in a fixed layout for scanning an object 504 positioned on a turntable 506 (or platform) that is configured to be rotated by a motor 508. The layout of the scanheads 502A-C covers angles above and below the turntable 506, for example.

Within the example shown in FIG. 5, scanhead 502A is positioned below the turntable 506 so as to capture an image of a portion of an underside of the object, scanhead 502b is positioned above the turntable 506, and scanhead 502c is positioned above the turntable 506 and offset from a position of the scanhead 502b. All the scanheads 502a-c are positioned such that each scanner is outside of a field of view of other scanners.

In one example, the scanhead 502a is positioned below the platform and is oriented at an angle of about 45 degrees below the platform. From this angle, the scanhead 502a can capture images on an underside of the object 504. The scanhead 502a will project light during scanning, and the glass surface of the turntable 506 may reflect the light, which can cause poor image capture. Thus, within examples, the system 500 may be included within an enclosure 510, and an area in the enclosure opposite the scanhead 502a may include a light-absorbing element 512 to absorb light projected by the scanhead 502a that is reflected off an underside of the turntable 506. The light-absorbing element may include a dark object, dark coating, or dark color material, for example. The enclosure 510 may include a door or opening to enable the object 504 to be provided on the turntable 506.

In another example, the scanhead 502b may be positioned above the turntable 506 and oriented at an angle of about 20 degrees above the turntable 506. The scanhead 502c may be positioned above the turntable 506 and offset from the position of the scanhead 502b, and oriented at an angle of about 80 degrees above the turntable 506 and about 15 degrees offset from the position of the scanhead 502b. The scanhead 502c may be configured to provide a birds-eye view or top-down view into the object 504, but not directly down or perpendicular to the turntable 506 so as to avoid direct reflection of light. The turntable 506 may include a glass surface, and the scanheads 502b-c are positioned above the glass surface and oriented at an angle with respect to a plane normal to the glass surface.

The configuration and layout of the scanheads 502a-c provides desirable image capture positioning, and none of the scanheads 502a-c are within a field of view of any other scanhead. In this configuration, images captured by the scanheads 502a-c will not include images of other scanheads, and thus, image processing may be performed more quickly to generate a 3D object data model of the object 504. In addition, the scanheads 502a-c are positioned such that the motor 508 is not within the field of view of any scanhead as well. Using the example scanhead layout in FIG. 5, the scanheads 502a-c capture images of the object 504 and avoid capturing within those images any unnecessary or unwanted components of the system 500.

FIGS. 6A-6D illustrate example configurations and layouts of a platform and motor for an object-image acquisition system.

Figure 6A:
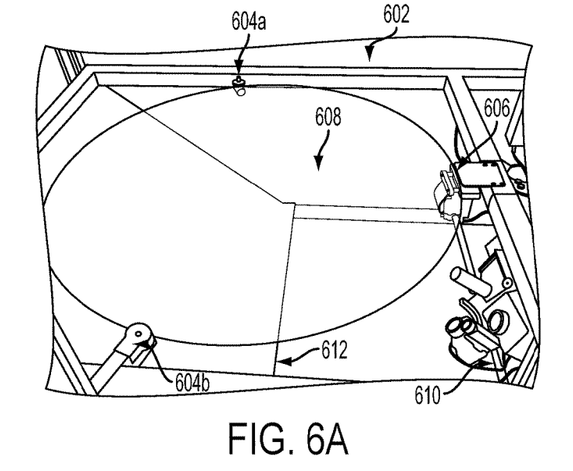
FIGS. 6A-6D illustrate example configurations and layouts of a platform and motor for an object-image acquisition system.

FIG. 6A illustrates a support structure 602 and a plurality of rollers 604A-B coupled to the support structure 602, as well as a drive wheel 606 coupled to the support structure 602. A platform 602, which may be a glass turntable as within examples discussed above, has edges mounted to contact the plurality of rollers 604A-B and the drive wheel 606 is configured contact the edges of the platform 602. The drive wheel 606 may be operated to cause the platform 608 to rotate via contact with the drive wheel 606 and the plurality of rollers 604a-b. Configuration of the rollers 604a-b and drive wheel 606 in this manner enables an edge-mounted and edge-driven platform 608 with low visibility mounting.

The example shown in FIG. 6A includes two rollers 604A-B, and the platform 608 is configured to have a front edge that contacts the drive wheel 606, a back edge opposite the front edge, and side edges between the front edge and the back edge that contact the two rollers 604a-b. Within examples, the two rollers 604a-b and the drive wheel 606 are coupled to the support structure 602 in a triangle configuration to provide three points of support for the platform 608 that are oriented to minimize interference with a field of view of any scanners. For example, a scanner 610 may be positioned underneath the platform 608 facing upward to capture an image of an underside of an object positioned on the platform 608, and no mounts for the platform 608 may be visible in images captured by the scanner 610.

In some examples, a plurality of scanners may be provided that are configured to capture geometry and texture information of an object when the object is positioned on a surface of the platform 608. The scanners may be positioned generally as described in the example in FIG. 5. Since the platform 608 is positioned in the configuration shown in FIG. 6A, the scanners field of view will be free from any visible support to enable capture of images without any visible support as well to simplify image processing and lower an amount of shadows from the lighting system.

As shown, the scanner 610 may be to have a field of view of the back edge of the platform 608 so that the rollers 604a-b and the drive wheel 606 are outside of a field of view of the scanner 610. The scanner 610 may project light that can reflect off of a surface of the platform 608, and a light-absorbing element 612 may be positioned to absorb any reflected light, for example.

Figure 6B:
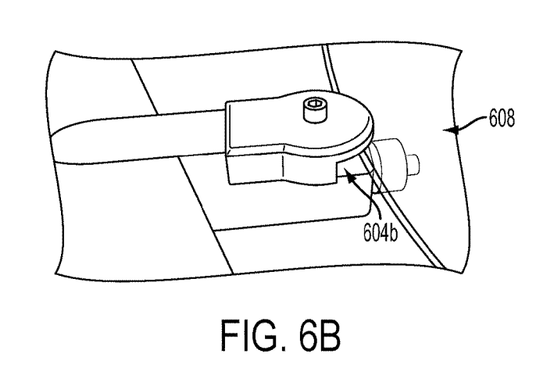

FIG. 6B illustrates a view of a roller and platform configuration. The roller 604b may include a wheel internal to a mount that contacts an edge surface of the platform 608 and allows the platform to rotate via rotation of the wheel.

Figure 6C:
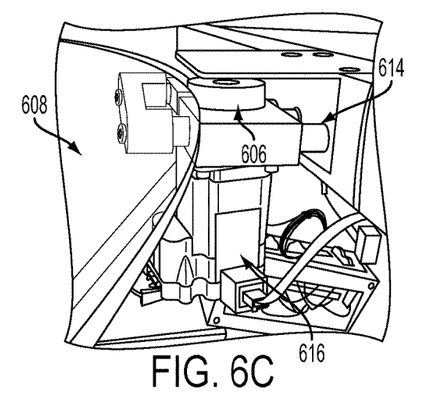
Figure 6D:
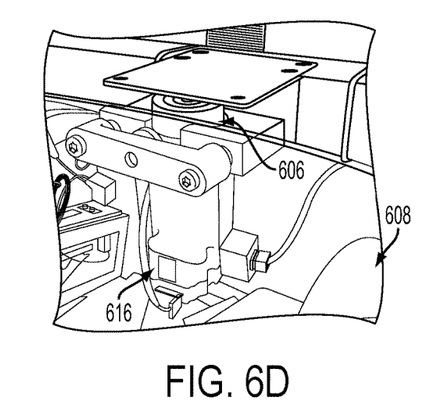

FIG. 6C illustrates a side view of the drive wheel and platform configuration, and FIG. 6D illustrates a front view of the drive wheel and platform configuration. The drive wheel 606 contacts an edge surface of the platform 608 and also couples to a motor through motor controls 616. The drive wheel 606 may be powered to rotate, and via contact with the platform 608, the platform 608 will also rotate. The drive wheel 606 is mounted on the support structure 602 and includes a spring 614 to be spring loaded to provide contact with the platform 608 in a rigid manner. Thus, the drive wheel 606 pushes the platform 608 into the static rollers 604a-b.

Within examples, a scanning apparatus, such as the system 500 in FIG. 5, may be used to capture color and texture of an object. Within the system, it is desirable that colors of an object not be affected by curvatures or shadows of the object. Thus, within examples, a system is provided that may be configured to create a diffuse lighting environment, where there is about a same amount of light present from all angles onto the object. In one example, a diffuse lighting setup for capture of color and texture of an object is provided. The system is configured to include a diffusion curtain and light tunnels (lights aimed between an interior of the scanner and the diffusion curtain) to obtain a diffuse lighting configuration. Diffuse light may enable capturing a texture of the object that can merge well from multiple views (e.g., as lighting varies over a surface of the object, there may be less compatible images from different angles). Thus, it may be desirable for the lighting on the object to be about the same from all angles.

FIGS. 7A-7D illustrates an active ducted cooling system, in accordance with some examples herein.

Figure 7A:
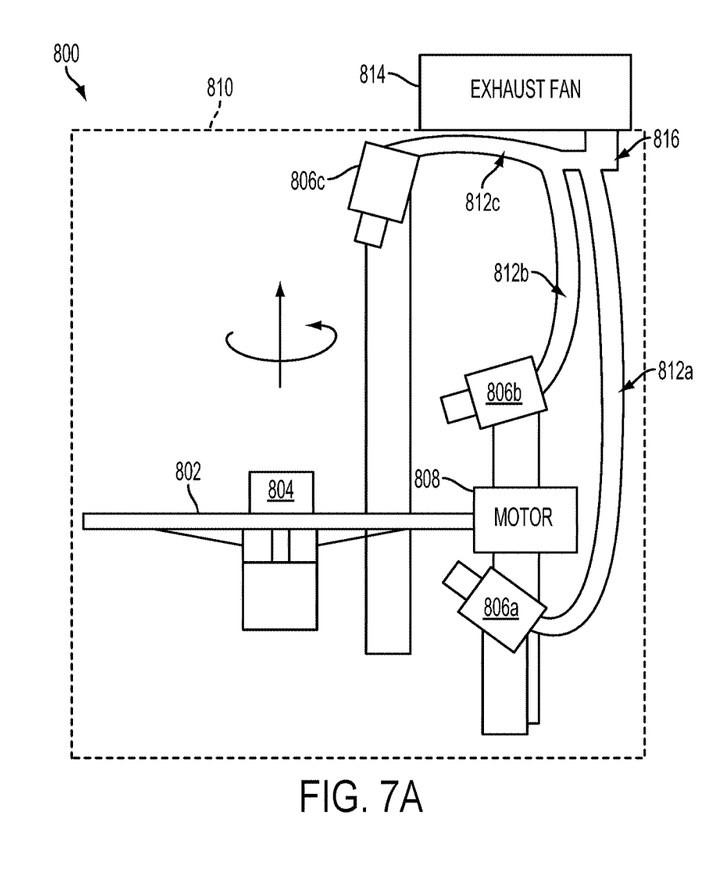
FIGS. 7A-7D illustrates an active ducted cooling system, in accordance with some examples herein.

In FIG. 7A, a system 800 is shown, similar to those previously described, that includes a turntable 802 on which an object 804 is placed for imaging. Scanners 806a-c are positioned around the object to capture images as the turntable 802 is rotated via a motor 808. The system 800 may be enclosed within an enclosure 810. The scanners 806a-c may generate heat, and a cooling system can be provided to cool the system 800.

The cooling system may include a plurality of air ducts 812a-c within the enclosure 810 that are coupled to respective scanners 806a-c. The air ducts 812a-c are each coupled to an exhaust fan 814 that is positioned outside of the enclosure 810 and is configured to cause heat generated by the scanners 806a-c to be removed from the enclosure 810. The air ducts 812a-c may merge into an exhaust pipe 816 that couples to the exhaust fan 814.

Within examples, the exhaust 814 pulls hot air out of the enclosure 810. Specifically, the air ducts 812a-c may be coupled to the scanners 806a-c through respective seals, such that hot air is maintained within the air ducts 812a-c and exits the enclosure 810 through the exhaust fan 814. The scanners 806a-c may include a camera and a light source, and the air ducts 812a-c may be coupled to the light sources of the scanners 806a-c that generate a majority of heat in the scanner. The scanners 806a-c may also include respective fans that couple to the air ducts 812a-c and cool the scanners 806a-c.

The air ducts 812a-c may be flexible and enable the scanners 806a-c to move within the enclosure 810 and maintain a coupling to the air ducts 812a-c.

The enclosure 810 may prevent light exterior to the enclosure 810 from entering the enclosure 810, and the air ducts 812a-c are coupled to the exhaust fan 814 positioned outside of the enclosure 810 in a manner configured to prevent light exterior to the enclosure 810 from entering the enclosure 810. Using the active cooling system, light may be sealed within the enclosure 810 in contrast to adding a vent to the enclosure 810.

In addition, within examples, it is desirable to maintain a positive air pressure within the enclosure to avoid dust entering when the enclosure 810 is opened to replace the object 804 with a new object for scanning. Thus, the exhaust fan 814 is configured to pull air out of the scanners 806a-c, rather than push air into the scanners 806a-c, so that air movement within system 800 is maintained still and there is little or no airflow within an interior of the enclosure 810.

The cooling system may be always on to cool the scanners 806*a-c*, or always on during scanning. In other examples, a sensor may be coupled to each respective scanner 806*a-c* that is configured to determine a temperature of the scanner or of components of the scanner, and is configured to output a signal indicating to activate the exhaust fan 814 based on a temperature of a component of the respective scanner exceeding a threshold. The scanners 806*a-c* may have operating temperatures in the range of 60-90 degrees Fahrenheit, and the exhaust fan 814 may be configured to activate when a temperature is within such operating temperature range so as to maintain the operating temperature, for example.

Figure 7B:
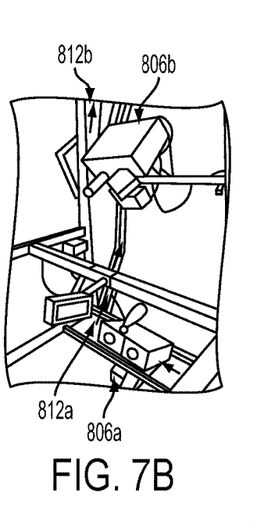
Figure 7C:
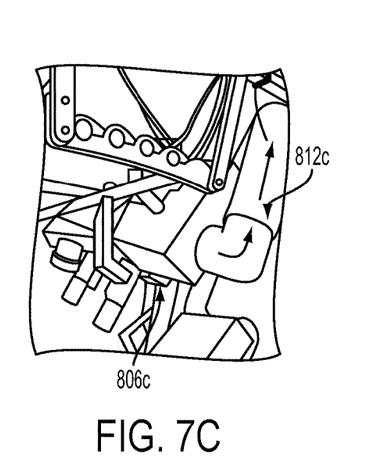
Figure 7D:
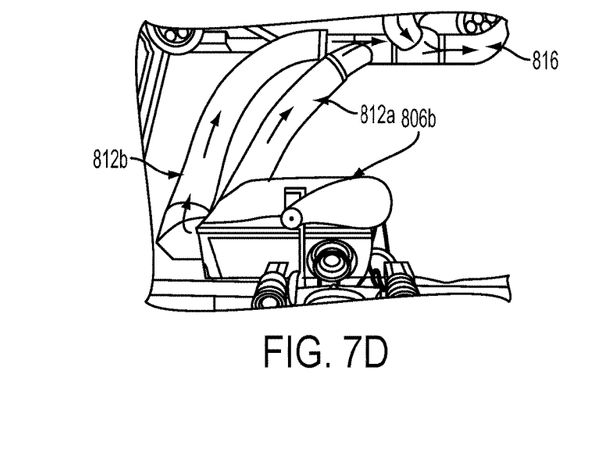

FIGS. 7B-7D illustrate alternate views of the scanners 806*a-c* and air ducts 812*a-c* as may be configured within examples for the system 800.

Figure 8A:
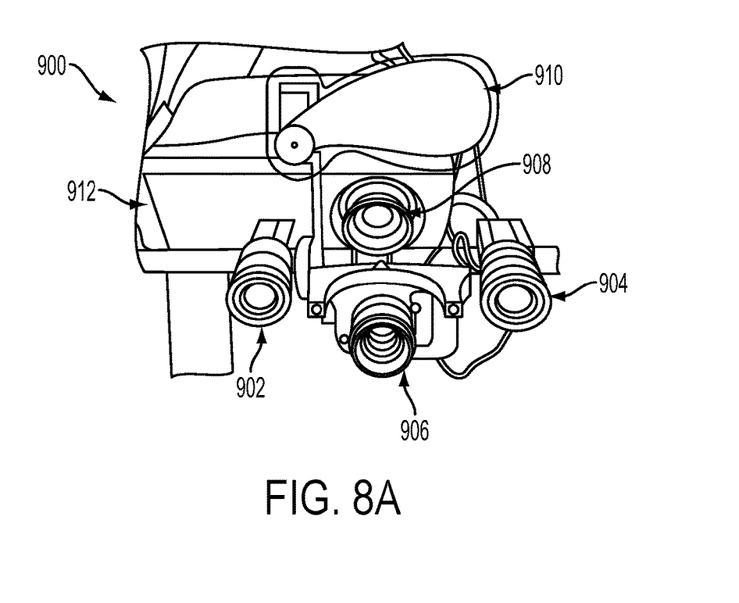
FIGS. 8A-8C illustrate example configurations for a scanner.
Figure 8B:
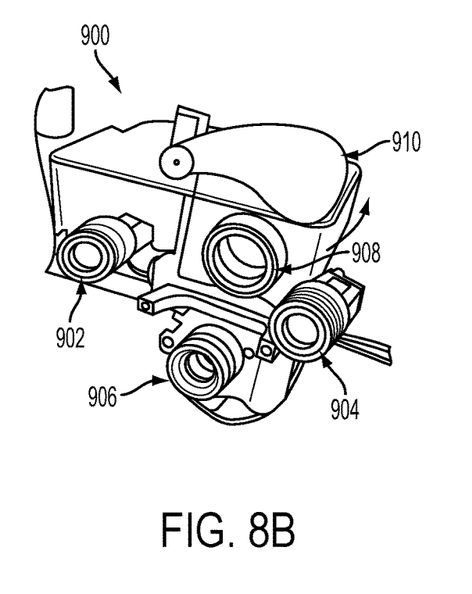
Figure 8C:
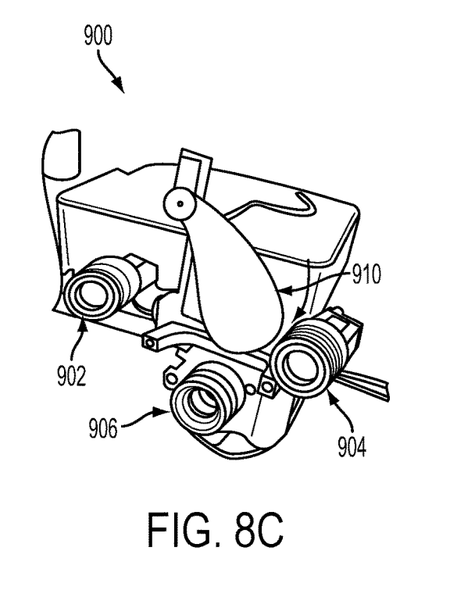

FIGS. 8A-8C illustrate example configurations for a scanner.

FIG. 8A illustrates a scanner 900 that includes machine vision cameras 902 and 904 mounted in a stereo arrangement, a texture camera 906, a projector 908, and a light-dampening element 910. To scan an object, the projector 908 projects light (e.g., in a pattern) onto the object, and the cameras 902, 904, and 906 may be configured to capture an image of the object with the light pattern projected thereon. A scanning system may be configured to include multiple scanheads (such as multiple scanners 900) and each may interfere with each other if one scanner is projecting light and capturing images while another scanner is doing the same. In some instances, it is desirable to operate one scanner at a time to capture images, and to turn off the projector on other, idle scanners. However, based on light sources used for the projector 908, such as halogen or xenon lamps, turning off the projector 908 may require an amount of time and may not be instant (e.g., a warm-down period may be required). And, to scan one object, a given projector of each scanner in the scanning system may need to be turned on and off to generate various patterns about eight times or more to capture a sequence of images of the object with various patterns. Thus, a large amount of time may be required to perform the scan if the projectors are turned on and off during the scanning process. Still further, even when the light source of the projector 908 is turned off, the light source may provide residual light for some time.

Within examples, to avoid interference or a need to cycle power to the light sources of projectors, the light-dampening element 910 is provided, and may act as an active projector damper. The light-dampening element 910 may include a dark (black) plastic material that is configured to cover the projector 908 to block all light that may exit the projector 908. When not in use, the projector 908 may be turned off, and the light-dampening element 910 may cover the projector 908 to block any residual light.

In some examples, the scanner 900 may include or be coupled to a control module 912 that is configured to operate the scanner 900, and possibly to operate all scanners of a scanning system to individually scan the object when the object is positioned on a platform to capture geometry and texture information of the object. The control module 912 causes the light-dampening element 910 to cover the light source or the projector 908 of the scanner 900 during scanning by another scanner of the system and causes the light-dampening element 910 to uncover the light source or the projector 908 of the scanner 900 during scanning by the scanner 900.

Thus, during scanner by a scanner of the system, the light-dampening element 910 may be configured in a position as shown in FIG. 8B. During scanner by other scanners, the light-dampening element 910 may be configured in a position as shown in FIG. 8C. As a result, during scanning by any given scanner, all other scanners of the system may have respective light-dampening elements in a down position to cover all other potential light sources. In one example, the scanning system may include three scanheads (e.g., one above, below, and to a side of a turntable), and the scanheads each have light-dampening elements that work together to avoid interference with each other. Inactive scanners will have light-dampening elements covering their light sources so that light of one scanner does not project into a given camera of another scanner.

The control module 912 may be configured to operate the multiple scanners in the scanning system in sequence to individually scan the object using one of the scanners at a time, and light sources of the scanners are configured to be on during scanning of the object. Light-dampening elements cover light sources of respective scanners in the sequence so as to lower interfering light projected by the light source of the respective scanners to the another scanner.

Within examples, a configuration of the scanner, such as the scanner 900 in FIGS. 8A-8C, may be configured to be rigidly mounted. A rigid configuration enables the scanner to be locked in placed so that after a calibration, the scanners may be in optimized positions. The mount may include a machined scanhead comprising aluminum. The rigid mount enables calibrations to be performed a low number of times since the components will remain rigidly attached. In addition, the aluminum material may provide or act as a heat sink for the machine vision cameras or other components of the scanner. The scanner attaches to the scanner frame via an aluminum bar which further may carry heat away from the scanner.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   capturing, using a plurality of scanners, geometry and texture information of an object positioned on a platform, wherein a first scanner of the plurality of scanners is positioned below the platform so as to capture an image of a portion of an underside of the object when the object is positioned on the platform and a second scanner of the plurality of scanners is positioned above the platform, wherein the plurality of scanners are positioned such that a given light source of one scanner is configured to project light into a given camera of another scanner, wherein each scanner includes a camera, a light source, and a cover coupled to the light source; and operating, by a computer, the plurality of scanners individually to scan the object when the object is positioned on the platform to capture the geometry and texture information, wherein the computer causes the cover to cover the light source of respective scanners during scanning by another scanner and causes the cover to uncover the light source of a given scanner during scanning by the given scanner.

2. The method of claim 1, wherein a third scanner of the plurality of scanners is positioned above the platform and offset from a position of the second scanner.

3. The method of claim 1, further comprising the computer causing the cover to cover the light source of respective scanners when the respective scanners are inactive.

4. The method of claim 1, further comprising the computer operating the plurality of scanners in sequence to individually scan the object using one of the plurality of scanners at a time.

5. The method of claim 1, further comprising the computer causing light sources of the plurality of scanners to be on during scanning of the object, and causing respective covers to cover respective light sources of respective scanners in the sequence.

6. The method of claim 1, further comprising the computer causing covers to cover all light sources except a respective light source of a respective scanner performing scanning at the time.

7. The method of claim 1, wherein the plurality of scanners are positioned in an enclosure, and the method further comprises an exhaust fan causing heat generated by the plurality of scanners to be removed from the enclosure.

8. A method comprising:
capturing, using a plurality of scanners positioned within an enclosure, geometry and texture information of an object positioned within the enclosure;
positioning a plurality of air ducts within the enclosure and coupled to the plurality of scanners, wherein a given air duct is coupled to a given scanner of the plurality of scanners, wherein the plurality of air ducts are flexible and enable the plurality of scanners to move within the enclosure and maintain a coupling to the plurality of air ducts; and
causing an exhaust fan positioned outside of the enclosure and coupled to the plurality of air ducts to remove heat generated by the plurality of scanners from the enclosure.

9. The method of claim 8, further comprising:
operating, by a computer, the plurality of scanners individually to scan the object when the object is positioned on a platform in the enclosure to capture the geometry and texture information.

10. The method of claim 8, further comprising:
the computer causing a cover to cover the light source of respective scanners during scanning by another scanner and causing a cover to uncover the light source of a given scanner during scanning by the given scanner.

11. The method of claim 10, further comprising the computer causing the cover to cover the light source of respective scanners when the respective scanners are inactive.

12. The method of claim 8, further comprising the computer operating the plurality of scanners in sequence to individually scan the object using one of the plurality of scanners at a time.

13. The method of claim 8, further comprising the computer causing light sources of the plurality of scanners to be on during scanning of the object, and causing respective covers to cover respective light sources of respective scanners in the sequence.

14. The method of claim 8, further comprising the computer causing covers to cover all light sources except a respective light source of a respective scanner performing scanning at the time.

15. A method for scanning an object positioned on a turntable mounted such that edges of the turntable contact a plurality of rollers and a surface of the turntable is configured to enable the object to be positioned thereon, the method comprising:
rotating the turntable via contact with a drive wheel that contacts the edges of the turntable and the plurality of rollers;
capturing, using a plurality of scanners, geometry and texture information of the object when the object is positioned on the surface of the turntable, wherein each scanner includes a camera, a light source, and a cover coupled to the light source; and
operating, by a computer, the plurality of scanners individually to scan the object when the object is positioned on the platform to capture the geometry and texture information, wherein the computer causes the cover to cover the light source of respective scanners during scanning by another scanner and causes the cover to uncover the light source of a given scanner during scanning by the given scanner.

16. The method of claim 15, wherein a first scanner of the plurality of scanners is positioned below the turntable so as to capture an image of a portion of an underside of the object when the object is positioned on the surface of the turntable and a second scanner of the plurality of scanners is positioned above the turntable.

17. The method of claim 15, wherein the plurality of scanners are positioned such that a given light source of one scanner is configured to project light into a given camera of another scanner.

18. The method of claim 15, further comprising the computer causing the cover to cover the light source of respective scanners when the respective scanners are inactive.

19. The method of claim 15 further comprising the computer operating the plurality of scanners in sequence to individually scan the object using one of the plurality of scanners at a time.

20. The method of claim 15, further comprising the computer causing light sources of the plurality of scanners to be on during scanning of the object, and causing respective covers to cover respective light sources of respective scanners in the sequence.

* * * * *